United States Patent
Lee

(10) Patent No.: US 7,457,615 B2
(45) Date of Patent: Nov. 25, 2008

(54) METHOD FOR PROCESSING QUERY EFFECTIVELY IN RADIO DATA BROADCAST ENVIRONMENT

(75) Inventor: Sang Keun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 602 days.

(21) Appl. No.: 10/265,321

(22) Filed: Oct. 7, 2002

(65) Prior Publication Data

US 2003/0069034 A1    Apr. 10, 2003

(30) Foreign Application Priority Data

Oct. 5, 2001    (KR)    ............ 10-2001-0061481

(51) Int. Cl.
    *H04L 29/06*    (2006.01)
(52) U.S. Cl. ............ 455/414.3; 455/517; 455/3.02; 455/414.1; 711/158; 711/169
(58) Field of Classification Search ............ 455/414.3, 455/426, 414, 412, 41, 517, 3.02, 414.1; 711/140, 156, 158, 167–169; 710/20, 27, 710/52, 55, 58
    See application file for complete search history.

(56) References Cited

U.S. PATENT DOCUMENTS

| | | | | |
|---|---|---|---|---|
| 5,905,957 A * | 5/1999 | Olds | ............ | 455/435.1 |
| 5,917,915 A * | 6/1999 | Hirose | ............ | 380/228 |
| 6,408,179 B1 * | 6/2002 | Stosz et al. | ............ | 455/428 |
| 6,463,282 B2 * | 10/2002 | Norin et al. | ............ | 455/429 |
| 6,529,740 B1 * | 3/2003 | Ganucheau et al. | ............ | 455/519 |
| 6,629,220 B1 * | 9/2003 | Dyer | ............ | 711/158 |
| 6,725,022 B1 * | 4/2004 | Clayton et al. | ............ | 455/154.1 |
| 6,738,635 B1 * | 5/2004 | Lewis et al. | ............ | 455/466 |
| 6,775,537 B1 * | 8/2004 | Panichkul et al. | ............ | 455/414.1 |
| 6,785,562 B2 * | 8/2004 | Lee et al. | ............ | 455/566 |
| 6,807,409 B1 * | 10/2004 | Davidson et al. | ............ | 455/406 |
| 6,925,078 B1 * | 8/2005 | Sherer et al. | ............ | 370/389 |
| 7,025,209 B2 * | 4/2006 | Hawkins | ............ | 209/217 |
| 2002/0152267 A1 * | 10/2002 | Lennon | ............ | 709/203 |
| 2003/0050058 A1 * | 3/2003 | Walsh et al. | ............ | 455/426 |

FOREIGN PATENT DOCUMENTS

| | | |
|---|---|---|
| EP | 0973284 A1 | 1/2000 |
| JP | 2001-258067 | 9/2001 |
| WO | 01/03455 A1 | 1/2001 |
| WO | 01/43425 A1 | 6/2001 |

OTHER PUBLICATIONS

Japanese Office Action dated Jun. 7, 2006.

* cited by examiner

*Primary Examiner*—Matthew Anderson
*Assistant Examiner*—Dominic E Rego
(74) *Attorney, Agent, or Firm*—Ked & Associates, LLP

(57) ABSTRACT

A method for processing query effectively in a radio data broadcast environment is able to minimize a query response time by pre-declaring data items which are wanted to be accessed by a mobile client before the query is operated, and by obtaining data of the pre-declared data items in advance from a radio space regardless of data transmitting order.

10 Claims, 2 Drawing Sheets

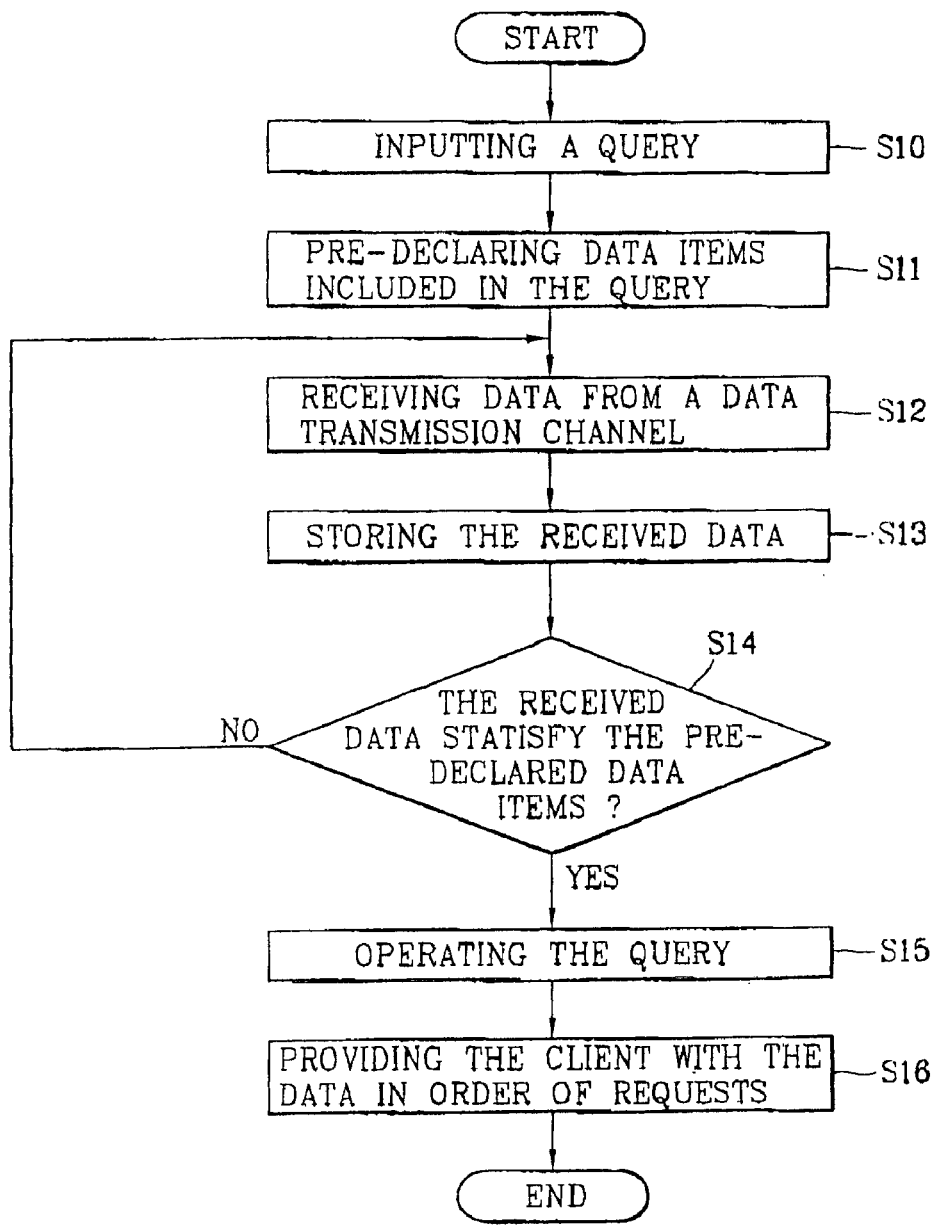

_US 7,457,615 B2_

METHOD FOR PROCESSING QUERY EFFECTIVELY IN RADIO DATA BROADCAST ENVIRONMENT

BACKGROUND OF THE INVENTION

1. Field of the Invention

The present invention relates to a mobile communication terminal, and particularly, to a method for processing a query effectively in a radio data broadcast environment.

2. Description of the Background Art

Recently, researches for mechanisms of effectively transmitting information to mobile clients in a radio data broadcast environment are proceeded actively. The mechanism is used when a satellite or a base station transmits information to mobile clients.

The transmission based on a broadcast method can be applied to various applications including transmitting information to a plurality of clients. As examples of broadcast-based applications, there are stock exchange, news, weather information, e-mail, e-banking service, traffic information system, etc.

In case that a certain data item is required among those applications, the client can obtain required data in a standby mode when a server transmits the data. Therefore, broadcasting the data has an advantage of effectively using bandwidth since requests of a plurality of clients wanting the same data can be satisfied at the same time.

The mechanisms used in the radio broadcast environment are different in details, however, these are based on a common principle of accessing to the data sequentially "one-at-a time". That is, in the broadcast-based transmission, the mobile client adopts an access mode, that is, waits for another data after obtaining data from the server.

Therefore, for a conventional broadcast-based transmission, a response time for a query of the client is significantly increased if the number of data items which will be accessed or if the data are often updated in the server.

For example, when the base station server wirelessly broadcasts a plurality of data, the client should receive the data in transmission order for reproducing the data. However, even if the base station server transmits the data in a certain order, the data receiving order can be changed according to a channel status, and therefore, data transmitted later may be delivered first to the client. In the above case, the client does not receive the delivered data and waits for the desired data according to the transmission order. Thereby, the query response time is increased.

SUMMARY OF THE INVENTION

Therefore, an object of the present invention is to provide a method for effectively processing a query in a radio data broadcast environment which is able to minimize a query response time by applying a pre-declaration method.

To achieve the object of the present invention, as embodied and broadly described herein, there is provided a method for processing a query effectively in a radio data broadcast environment comprising: receiving a query from a mobile client; pre-declaring all data items to which the query can access; receiving data of the pre-declared data items; and operating the query when all data are received.

To achieve the object of the present invention, there is provided a method for processing a query effectively in a radio data broadcast environment comprising: receiving a query from a mobile client; pre-declaring all data items to which the query can access; receiving data broadcasted in a base station; checking whether or not the received data satisfy the pre-declared data items; and providing data in order of requesting by the client by operating the query when the received data satisfy the pre-declared data items.

Preferably, the received data are received in order of data presenting on a radio space, not in order of accessing to the data by the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart showing detailed operations of the method for processing a query effective in the radio data broadcast environment according to the present invention.

FIG. 4 illustrates the response time of the present invention compared to the prior art.

DETAILED DESCRIPTION OF THE PREFERRED EMBODIMENTS

Reference will now be made in detail to the preferred embodiments of the present invention, examples of which are illustrated in the accompanying drawings.

Generally, a base station server executes a broadcast program to broadcast data items to a plurality of mobile clients during a period.

Figure 1A:
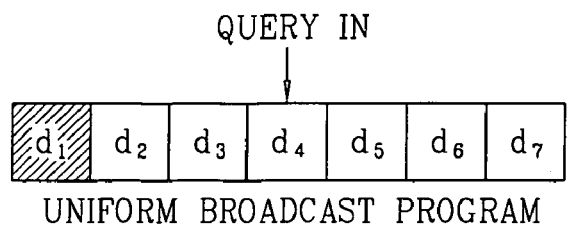
FIG. 1A is a view showing a scheduling method by a nonuniform broadcast program in a radio data broadcast environment.
Figure 1B:
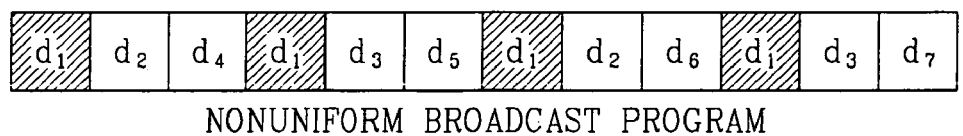
FIG. 1B is a view showing a scheduling method by a uniform broadcast program in a radio data broadcast environment.

FIGS. 1A and 1B show two scheduling methods when the base station server broadcasts the data wirelessly.

As shown in FIG. 1A, the base station server runs a uniform broadcast program, and broadcasts all data items one by one during one broadcast period regardless of data access frequency.

Also, as show in FIG. 1B, the base station server runs a nonuniform broadcast program to broadcast the data items differently according to the data access frequency. That is, the data (d1) having a high access frequency is broadcasted many times during one period, and data (d4-d7) having a relatively low access frequencies are broadcasted less. At that time, an order of the access frequencies is d1>d2, d3>d4-d7.

A case that a client performs a query such as "if (d3≦3) then read (d1) else read (d2)" in the middle of the broadcast period will be described as an example. At that time, it is assumed that the query is performed in FIG. 1A in order to identify affects to response time according to data accessing order.

In the scheduling method of FIG. 1A, d1 and d2 reach a mobile terminal earlier than d3. However, since the data access by the client is made sequentially, the mobile terminal should wait until the d1 or d2 reaches thereto after reading the d3.

After that, when d1 or d2 is transmitted again, the mobile terminal receives the data in order of d3→d1 or d3→d2, and therefore, response time of the query (based on a unit time used for broadcasting one data) is 11.5 ms (d3→d1) or 12.5 ms (d3→d2).

Therefore, if all data items (for example, d1, d2 and d3) to which the query will probably access are pre-declared, the client can obtain all required data in advance, and accordingly, the response time also can be reduced.

According to the present invention, the data items which can be accessed by the query, that is, all data presented on the query (for example, d1, d2 and d3) are pre-declared before the query is operated, and after that, the data are stored in order of appearing on a radio space, and therefore, the data can be provided in order of requesting by the mobile client.

Figure 2:
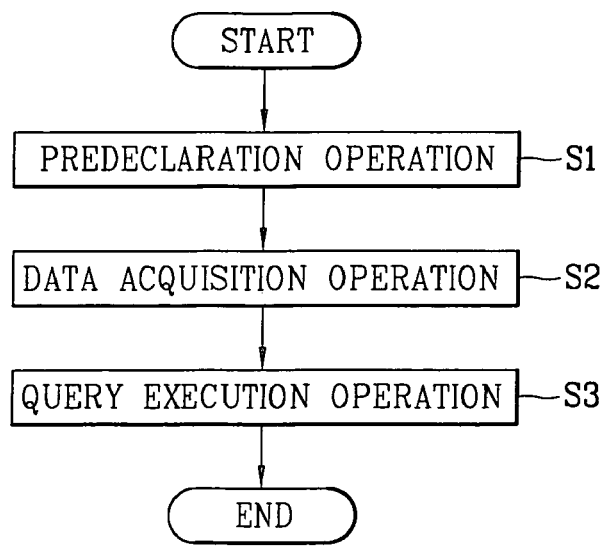
FIG. 2 is a flow chart roughly showing a method for processing a query effectively in a radio data broadcast environment according to the present invention.

That is, as shown in FIG. 2, the present invention performs a pre-declaration process for finding data items which can be accessed by the query when the query is inputted from the client (S1). When the data items are found, a data acquisition process for receiving and storing data from a data channel is performed (S2), and a query operation process for operating the query is performed when all the data corresponding to the data items are received (S3).

After that, the method for processing the query effectively in the radio broadcasting environment according to the present invention will be described in more detail with reference to FIG. 3.

When the query is inputted from the client (S10), the mobile terminal pre-declares all data items (d1, d2 and d3) presented on the query using a compiler (S11).

When the data items are found by the pre-declaration, the mobile terminal receives the data from the data channel (S12), and stores the received data in a flash memory (S13). At that time, the mobile terminal receives the data not in an accessing order of a user to the data, but by a presented order of the data on the radio space.

The mobile terminal checks whether or not the received data satisfy the pre-declared data items (S14). As a result of checking, if the received data satisfy the pre-declared data items, that is, when the data of all data items (d1, d2 and d3) are received, the mobile terminal operates the query to provide the data in order requested by the client (S16).

Therefore, according to the present invention, the mobile terminal does not have to wait until all data is received, and the query response time to the S16 process is only 6.5 ms.

As described above, according to the present invention, the query response time can be significantly reduced compared to the conventional art when the pre-declaration method is applied, and the advantage can be applied to the scheduling method on FIG. 1B. That is, when the pre-declaration method is applied to the scheduling method of FIG. 1B, the conventional response time is 7 ms or 8 ms, however, according to the present invention, the response time is reduced up to 5 ms as shown in FIG. 4.

That is, since many users receive the data service in the radio data broadcast, mismatch between the order of accessing to the data by the user and the order of broadcasting by the base station server is generated, and thereby, the query response time is increased greatly. Therefore, if the pre-declaration method suggested by the present invention is applied, the above problem can be solved originally.

In addition, the query processing method using the pre-declaration method can be applied most practically in an environment in which the flash memory included in the mobile terminal is used as a cache, however, it can be naturally applied to an environment in which the data server does not support the cache mechanism.

Also, according to the query processing method using the pre-declaration method, even if the data are updated frequently in the server, a consistency problem can be solved simply by broadcasting the data having consistency from respective broadcast periods. Therefore, the mobile terminal does not read the data on a discretionary time point, but reads the data on a starting point of the broadcast period to read all data in the period, and thereby, the data consistency can be ensured.

As described above, according to the present invention, the query response time can be minimized using the pre-declaration method in the radio data broadcast environment. Especially, according to the present invention, the data items which are wanted to be accessed by the client are pre-declared through the compiler before the query is operated, and thereby, the effective query processing can be made and the query response time can be minimized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for managing data in a processing system, comprising:

receiving a query input from a user into a mobile terminal, the query specifying a number of data items at least a portion of which are broadcast different numbers of times during a broadcast period;

pre-declaring the data items in the query, said pre-declaring selectively controlling whether the data items are to be received in the mobile terminal when broadcast from a broadcast source;

receiving the data items from the broadcast source, the data items received in a different order than specified in the query and in a different order than broadcast from the broadcast source;

storing the received data items in a memory, said storing including storing a first data item broadcast a greater number of times during said broadcast period before storing a second data item broadcast a lesser number of times during said broadcast period, the first data item ordered after the second data item in the query and received from the broadcast before the second data item; and outputting the stored data items on a terminal in the order specified in the query.

2. The method of claim 1, wherein said storing includes:

storing the data items in the memory in an order received from a radio space, said received order being different from the order specified in the query and different from the broadcast order from the broadcast source.

3. The method of claim 2, wherein said outputting includes:

determining whether all of the pre-declared data items have been received; and reading the data items from the memory in the order specified in the query.

4. The method of claim 1, the data items are received in an order presented in a radio space.

5. The method of claim 1, wherein the data items are pre-declared using a compiler.

6. The method of claim 1, wherein the memory is included in the terminal.

7. The method of claim 1, wherein the data items are received from a base station.

8. The method of claim 1, wherein the received data is broadcasted by a uniform broadcast program or a non-uniform broadcast program.

9. The method of claim 1, wherein the data items are received without transmitting the query from the mobile terminal.

10. The method of claim 1, further comprising:
checking whether the data items received from the broadcast source and stored in the memory correspond to the pre-declared data items, the stored data items being output on the terminal based on a result of said checking.

* * * * *